United States Patent
Hsu

(10) Patent No.: US 9,398,631 B2
(45) Date of Patent: Jul. 19, 2016

(54) METHOD FOR ESTABLISHING COMMUNICATIONS BETWEEN PEER DEVICES, WIRELESS COMMUNICATION DEVICE USING THE SAME AND COMPUTER-READABLE MEDIUM

(75) Inventor: Chih-Feng Hsu, Taoyuan County (TW)

(73) Assignee: HTC Corporation, Taoyuan (TW)

(*) Notice: Subject to any disclaimer, the term of this patent is extended or adjusted under 35 U.S.C. 154(b) by 393 days.

(21) Appl. No.: 13/598,618

(22) Filed: Aug. 30, 2012

(65) Prior Publication Data

US 2014/0065963 A1 Mar. 6, 2014

(51) Int. Cl.
*H04B 7/00* (2006.01)
*H04W 76/02* (2009.01)
*H04W 84/20* (2009.01)

(52) U.S. Cl.
CPC ............ *H04W 76/028* (2013.01); *H04W 84/20* (2013.01)

(58) Field of Classification Search
CPC ..... H04W 84/18; H04W 8/005; H04W 84/20; H04W 68/00; H04W 88/06; H04W 52/0216; H04W 76/00; H04W 76/02; H04W 24/00; H04W 36/16; H04W 4/008; H04M 1/7253; H04M 1/6066; H04M 2250/02; H04M 1/6075; H04M 1/6091; H04M 2250/12; H04L 67/04; H04L 67/306; H04L 12/189; H04L 51/26; H04L 63/107; H04L 67/16

USPC ................ 370/229, 270, 311, 328, 350, 338; 455/41.1–41.3, 507, 575.3, 422.1, 436, 455/502, 574, 343.1, 77

See application file for complete search history.

(56) References Cited

U.S. PATENT DOCUMENTS

| | | | |
|---|---|---|---|
| 2003/0124979 A1* | 7/2003 | Tanada et al. ................... | 455/41 |
| 2005/0033816 A1* | 2/2005 | Yamaguchi et al. .......... | 709/208 |
| 2006/0072525 A1* | 4/2006 | Hillyard ............... | H04W 84/20 370/338 |
| 2010/0022187 A1* | 1/2010 | Ohkita .............. | H04W 52/0261 455/41.2 |
| 2010/0075605 A1* | 3/2010 | Yoneda et al. ............... | 455/41.3 |
| 2012/0057518 A1* | 3/2012 | Herrala et al. ................ | 370/315 |
| 2012/0314623 A1* | 12/2012 | Pesonen ........................ | 370/255 |

* cited by examiner

*Primary Examiner* — Golam Sorowar
(74) *Attorney, Agent, or Firm* — Jianq Chyun IP Office

(57) ABSTRACT

A method for establishing a communication between a first peer device and a second peer device is provided. The method includes detecting the second peer device by the first peer device. The method also includes checking, by the first peer device, whether there is a deposited second address of the second peer device in an address database of the first peer device. The method further includes setting a role for the first peer device by the first peer device according to a first address and a second address when there is the deposited second address of the second peer device in the address database of the first peer device. The method further includes establishing a connection between the first peer device and the second peer device based on the role set for the first peer device.

13 Claims, 6 Drawing Sheets

METHOD FOR ESTABLISHING COMMUNICATIONS BETWEEN PEER DEVICES, WIRELESS COMMUNICATION DEVICE USING THE SAME AND COMPUTER-READABLE MEDIUM

BACKGROUND

1. Technology Field

The disclosure relates to a method for establishing a communication between two peer devices and a wireless communication device using the method and a computer-readable medium.

2. Description of Related Art

In recent years, a great number of electronic devices have come to have wireless communication functions. Subsequently, various wireless communication standards, such as the representative examples of personalized wireless techniques include a wireless LAN, and Bluetooth (registered trademark), have been established. These wireless techniques are implemented in various devices, primarily multi-functional electric appliances such as personal computers, cell phones, electronic notebooks, and so forth.

Take Bluetooth as an example, it is a wireless technology that allows short range communications between Bluetooth enabled electronic devices. Typically, in order for a first Bluetooth device capable of communicating using the Bluetooth communications protocol to communicate with a second Bluetooth device, the two Bluetooth devices have to operate in a master-slave configuration, wherein the Bluetooth device that requests a connection with another Bluetooth device is called a master and a Bluetooth computing device to be connected is called a slave, so that an operation or process that is termed "pairing" is performed within the Bluetooth devices.

Since the Bluetooth device may be in two different roles, such as the mater or the slave, before establishing the connection, however, when two Bluetooth devices are requesting a connection for each other simultaneously, the Bluetooth devices are in a state of competing for being the master, and thus the Bluetooth devices have to launch another request until the master-slave configuration is formed. Accordingly, it needs much time for pairing two Bluetooth devices.

SUMMARY

The disclosure provides a method for establishing a communication between two peer devices and a wireless communication device and a computer-readable medium, which are capable of effectively shortening the time for enabling a communication between the peer devices.

According to an exemplary embodiment of the disclosure, a method for establishing a communication between a first peer device and a second peer device is provided, wherein the first peer device has a first address and the second peer device has a second address. The method includes detecting the second peer device by the first peer device. The method also includes checking, by the first peer device, whether there is a deposited second address of the second peer device in an address database of the first peer device. The method further includes setting a role for the first peer device by the first peer device according to the first address and the second address when there is the deposited second address of the second peer device in the address database of the first peer device. The method further includes establishing a connection between the first peer device and the second peer device based on the role set for first peer device.

According to an exemplary embodiment of the disclosure, a wireless communication device for establishing a communication with a peer device is provided, wherein the wireless communication device has a first address, and the peer device has a second address. The wireless communication device includes a wireless transceiver, a storage unit and a reconnecting circuit, wherein the wireless transceiver is configured to detect the peer device, the storage unit is configured to store an address database, and the reconnecting circuit is coupled to the wireless transceiver and the storage unit. The reconnecting circuit is configured to check whether there is a deposited second address of the peer device in an address database of the wireless communication device. Additionally, when there is the deposited second address of the peer device in the address database of the wireless communication device, the reconnecting circuit sets a role for the wireless communication device according to the first address and the second address. Besides, the reconnecting circuit establishes a connection between the wireless communication device and the peer device based on the role set for the wireless communication device.

According to another exemplary embodiment of the disclosure, a method for establishing a communication between a first peer device and a second peer device is provided, wherein the first peer device has a first address and the second peer device has a second address. The method includes detecting the second peer device by the first peer device. The method also includes setting a role switching time for the first peer device by the first peer device based on the first address. The method further includes designating a first role for the first peer device by the first peer device and checking whether a second role of the second peer device is different from the first role at each role switching time. The method further includes when the second role of the second peer device is different from the first role, establishing a connection between the first peer device and the second peer device.

According to an exemplary embodiment of the disclosure, a wireless communication device for establishing communications with a peer device is provided, wherein the wireless communication device has a first address, and the peer device has a second address. The wireless communication device includes a wireless transceiver, a storage unit and a pairing circuit, wherein the wireless transceiver is configured to detect the peer device, the storage unit is configured to store an address database, and the pairing circuit is coupled to the storage unit and the wireless transceiver. The pairing circuit sets a role switching time for the wireless communication device based on the first address. Additionally, the pairing circuit designates a first role for the wireless communication device and checks whether a second role of the peer device is different from the first role at each role switching time. Besides, when the second role of the peer device is different from the first role, the pairing circuit establishes a connection between the wireless communication device and the peer device.

According to an exemplary embodiment of the disclosure, a computer-readable medium is provided, wherein the computer-readable medium stories a computer executable program. When the computer executable program is loaded to a wireless communication device having a first address, a processor of the wireless communication device executes the computer executable program to: detect a peer device by the wireless communication device; check, by the wireless communication device, whether there is a deposited second address of the peer device in an address database of the wireless communication device; set a first role for the wireless communication device by the wireless communication device according to the first address and the second address when there is the deposited second address of the peer device in the address database of the wireless communication device; and establish a connection between the wireless communication device and the peer device based on the role set for the wireless communication device.

According to an exemplary embodiment of the disclosure, a computer-readable medium is provided, wherein the computer-readable medium stories a computer executable program. When the computer executable program is loaded to a wireless communication device having a first address, a processor of the wireless communication device executes the computer executable program to: detect a peer device by the wireless communication device; set a role switching time for the wireless communication device by the wireless communication device based on the first address; designate a first role for the wireless communication device by the wireless communication device and check whether a second role of the peer device is different from the first role at each role switching time; when the second role of the peer device is different from the first role, establish a connection between the wireless communication device and the peer device.

In view of the foregoing, by setting the role and the role switching time according to the address of the wireless communication device for the wireless communication device to perform a pairing operation with the peer device, the time for enabling a pairing connection between the wireless communication device and the peer device is shorten. By this way, the connection between the wireless communication device and the peer device can be established efficiently.

In order to make the aforementioned and other objects, features and advantages of the disclosure more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
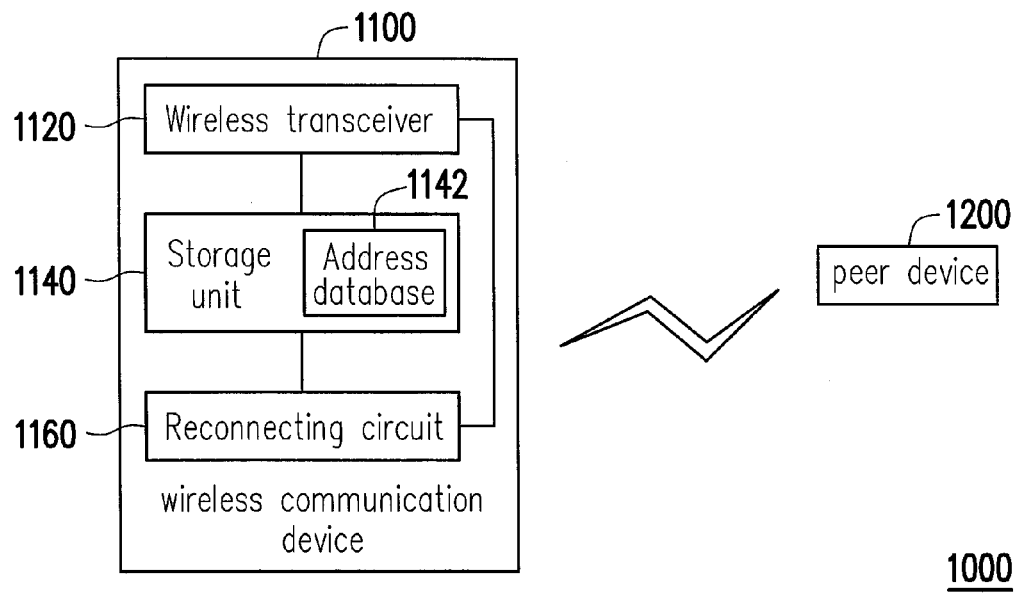
FIG. 1 is a schematic diagram illustrating a communication system according to a first exemplary embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic diagram illustrating a communication system according to a first exemplary embodiment of the present disclosure.

Referring to FIG. 1, a communication system 1000 includes a wireless communication device (also referred to as "first peer device") 1100 and a peer device (also referred to as "second peer device") 1200.

The wireless communication device 1100 has a first address, and the peer device 1200 has a second address. For illustration, the first address of the wireless communication device 1100 is denoted as the address Ao and the second address of the peer device 1200 is denoted as the address B1.

The wireless communication device 1100 may communicate with the peer device 1200 through the wireless connection. In addition, the communication between the wireless communication device 1100 and the peer device 1200 is performed in accordance with a Bluetooth protocol. In Bluetooth protocol, for example, the first address Ao or the second address B1 could be the Bluetooth device address indicating the network address of a Bluetooth-enabled device. The address is a unique address and usually used to identify a particular Bluetooth device during operations such as connecting to or pariring with the other Bluetooth device. It should be noted that although the wireless communication device 1100 and the peer device is Bluetooth-enabled, but it is not limited thereto. For example, in another exemplary embodiment, the communication device 1100 may communicate with the peer devices via other wireless or wired communication protocols, such as Wibree, Zigbee, Wireless USB, and Wi-Fi.

Figure 8:
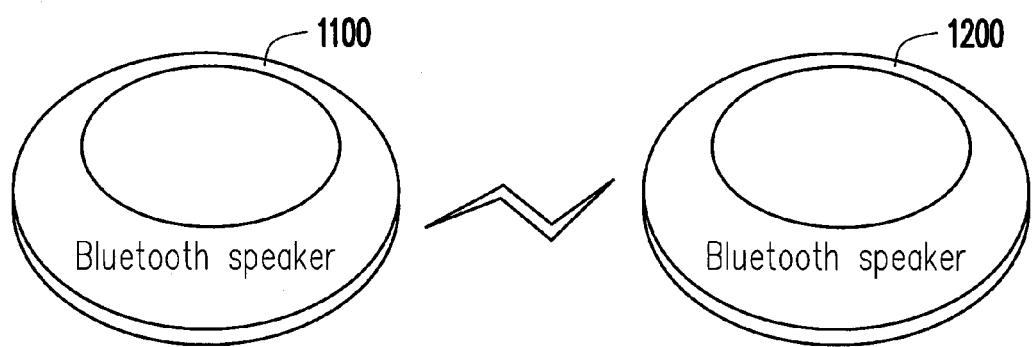
FIG. 8 is a diagram illustrating an example of two peer devices according to an exemplary embodiment of the present disclosure.

The wireless communication device 1100 and the peer device may be the same Bluetooth device and have the same structure. For example, the wireless communication device 1100 and the peer device 1200 may be Bluetooth speakers (as shown in FIG. 8). However, in another exemplary embodiment, the wireless communication device 1100 and the peer device 1200 may be personal computers, cell phones, personal digital assistants (PDAs), palmtops, e-Books or other devices with network access points, respectively.

The wireless communication device 1100 includes a wireless transceiver 1120, a storage unit 1140, and a reconnecting circuit 1160, wherein the reconnecting circuit 1160 is coupled to the wireless transceiver 1120 and the storage unit 1140.

The wireless transceiver 1120 is configured to detect the peer device 1200 that is being available for communication with which to connect. For example, the peer device 1200 may enter the Discoverable state as defined by the Bluetooth specifications, and thus the wireless transceiver 1120 of the wireless communication device 1100 may receive a communication signal sent from the peer device 1200 by performing a Bluetooth inquiry process as defined in the Bluetooth specification.

The storage unit 1140 is configured to store an address database 1142. The storage unit 1140 may be any type of fixed or removable random access storage unit (RAM), read-only storage unit (ROM), flash storage unit, or other similar devices. The address database 1142 may store the address Ao of the wireless communication device 1100. Besides, the address database 1142 may include a plurality of deposited addresses, and each of the deposited addresses, if existing in the address database 1142, corresponds to a peer device that has previously been paired with the wireless communication device 1100. For example, if the peer device 1200 has previously been paired with the wireless communication device 1100, the address B1 of the peer device 1200 is stored into the address database 1142 and defined as one deposited address. However, if no other peer devices have previously been paired with the wireless communication device 1100, none of the deposited address is stored in the address database 1142.

In another exemplary embodiment, the address database 1142 may store a pairing history that records the roles set for the pairing devices and the wireless communication device 1100 that have been previously paired. For example, if the peer device 1200 has previously been paired with the wireless communication device 1100, wherein the wireless communication device 1100 has been set as the master role, the pairing history may record this master configuration for the wireless communication device 1100. Here, the address stored in the address database 1142 may be Bluetooth address of the communication device 1100 and the peer device 1200; however, it is not limited thereto.

The reconnecting circuit 1160 is configured to perform a re-connecting process with a peer device, which has previously been paired with the wireless communication device 1100.

Figure 2:
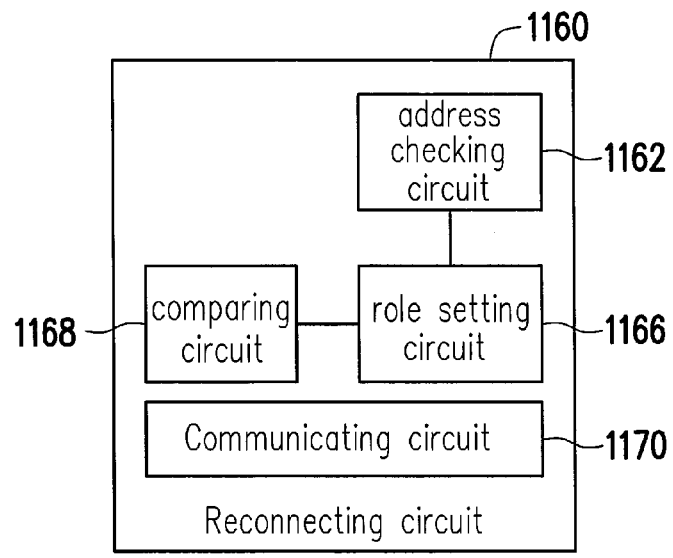
FIG. 2 is a schematic block diagram illustrating a reconnecting circuit according to the first exemplary embodiment of the present disclosure.

FIG. 2 is a schematic block diagram illustrating a reconnecting circuit according to the first exemplary embodiment of the present disclosure.

Referring to the FIG. 2, the reconnecting circuit 1160 includes an address checking circuit 1162, a role setting circuit 1166, a comparing circuit 1168 and a communicating circuit 1170.

The address checking circuit 1162 is configured to check whether a deposited address stored in the address database 1142 of the wireless communication device 1100 is the deposited address of the peer device 1200. Here, the peer device 1200 having the address B1 is detected by the wireless transceiver 1120 for illustration in the followings. Specifically, the address checking circuit 1162 checks if at least one deposited address is stored in the address database 1142 of the wireless communication device 1100. If there is one deposited address stored in the address database 1142, the address checking circuit 1162 may further acquire the deposited address, so that the deposited address acquired by the address checking circuit 1162 may be checked if being the deposited address of the peer device 1200. Then, when the deposited address is the deposited address of the peer device 1200 the address checking circuit 1162 may determine the deposited address as the address B1 of the peer device 1200.

For example, if one deposited address, denoted as deposited address A1, is checked being stored in the address database 1142, the address checking circuit 1162 may further acquire the deposited address A1, so that the deposited address A1 acquired by the address checking circuit 1162 may be checked if being the deposited address of the peer device 1200, i.e. the address B1. If the deposited address A1 checked by the address checking circuit 1162 is not the address B1, the address checking circuit 1162 may continue to check if other deposited address is stored in the address database 1142. Similarly, if the other deposited address, denoted as deposited address A2, is checked being stored in the address database 1142, the address checking circuit 1162 may further acquire the deposited address A2, so that the deposited address A2 acquired by the address checking circuit 1162 may be checked if being the address B1. If the deposited address A2 is the address B1, the address checking circuit 1162 determines the deposited address A2 as the address B1 of the peer device 1200 stored in the address database 1142. As such, the address checking circuit 1162 may check whether a deposited address, which indicates the deposited address of previously paired peer device, is stored in the address database 1142.

According to this exemplary embodiment, when the address checking circuit 1162 finds a deposited address determined as the address B1 of the peer device 1200, the role setting circuit 1166 sets a role for the wireless communication device 1100 according to the address Ao of the wireless communication device 1100. For example, the role may be one of a master role and a slave role.

For example, the comparing circuit 1168 may compare the address Ao of the wireless communication device 1100 and the address B1 of the peer device 1200 based on values of the address Ao and the address B1 respectively. In addition, when the value of the address Ao is larger than the value of the address B1, the role setting circuit 1166 may designate the wireless communication device 1100 as one of the master role and the slave role. For example, when the value of the address Ao is larger than the value of the address B1, the role setting circuit 1166 may designate the wireless communication device 1100 as the master role. Likewise, when the value of the address Ao is smaller than the value of the address B1, the role setting circuit 1166 may designate the wireless communication device 1100 as the slave role.

In another exemplary embodiment, when the address checking circuit 1162 finds that the address B1 of the peer device 1200 has previously been stored in the address database 1142, the role setting circuit 1166 may retrieve the pairing history of the wireless communication device 1100 from the address database 1142, so that the role setting circuit 1166 then sets the role according to the pairing history. For example, if the pairing history shows that the peer device 1200 has been the master and the wireless communication device 1100 has been the slave, then the role setting circuit 1166 determines the same master-slave configuration for the peer device 1200 and the wireless communication device 1100 according to the paring history.

According to this exemplary embodiment, after the role for the wireless communication device 1100 is set by the role setting circuit 1166, the communicating circuit 1170 re-connects with the peer device 1200 based on the set role. For example, when the wireless communication device 1100 is determined as the master role, the communicating circuit 1170 performs the re-connection, so that the communication between the wireless communication device 1100 and the peer device 1200 is established. In addition, the communicating circuit 1170 may activating a screen (not shown) of the wireless communication device 1100 to show a re-connecting interface, such that users can decide launching the re-connection.

It should be noted in the present disclosure, the reconnecting circuit 1160 is implemented in a hardware form, i.e., the address checking circuit 1162, the role setting circuit 1166, the comparing circuit 1168 and the communicating circuit 1170. However, the present disclosure is not limited thereto. For example, in another exemplary embodiment, functions of the reconnecting circuit 1160 may be implemented in a software form or a firmware form. For example, a processor and a memory storing program codes are disposed in the wireless communication device 1100 and the processor executes the program codes to perform the re-connecting process described above.

Figure 3:
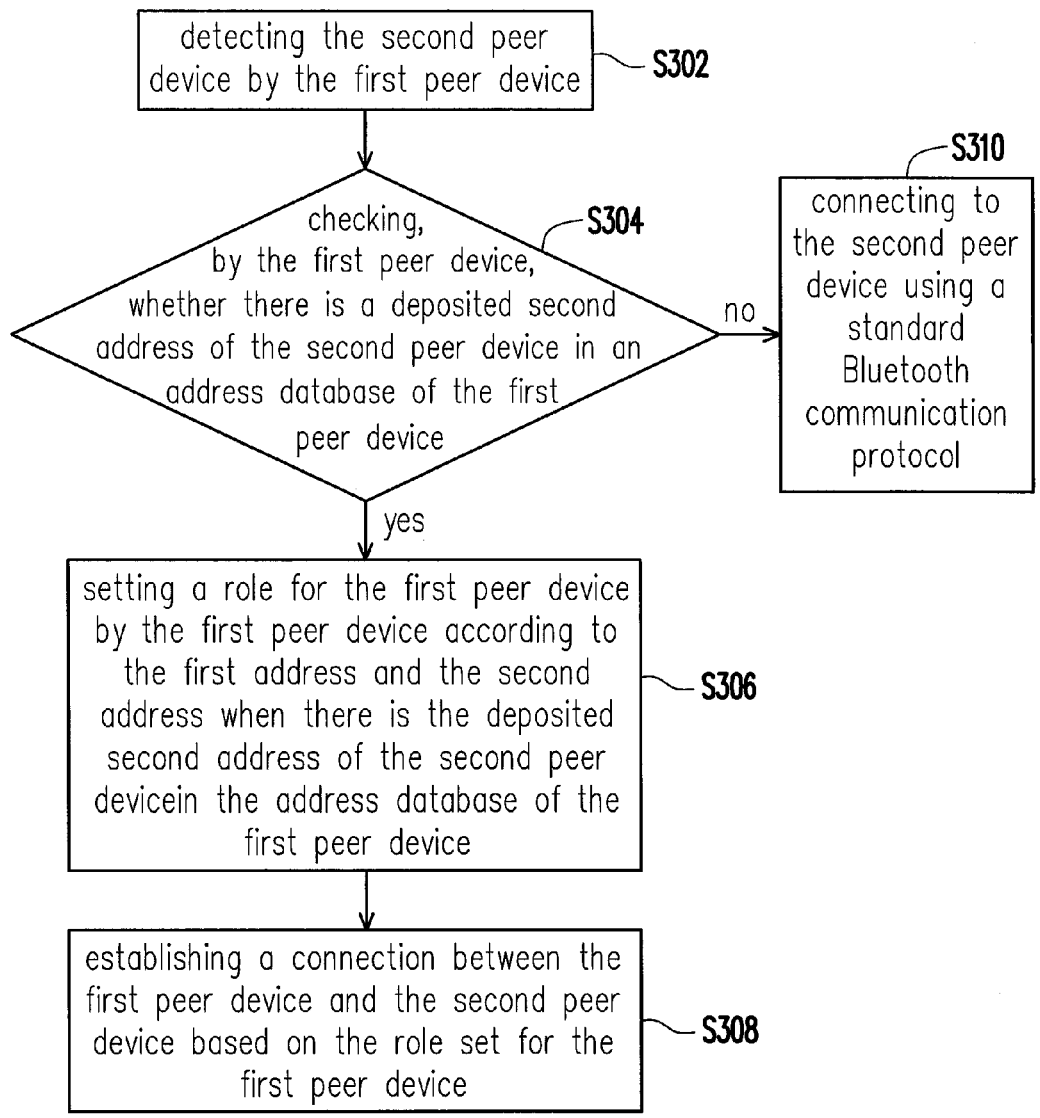
FIG. 3 is a flowchart of a method for establishing a communication between peer devices according to the first exemplary embodiment of the present disclosure.

FIG. 3 is a flowchart of a method for establishing a communication between peer devices according to the first exemplary embodiment of the present disclosure.

Referring to FIG. 3, in step S302, a second peer device (e.g., the peer device 1200) is detected by a first peer device (e.g., the wireless communication device 1100). For example, the first peer device receives a communication signal sent from the second peer device. In step S304, whether a deposited address of the second peer device, is stored in the address database of the first peer device is checked. To be specific, when there is any one deposited address found in the address database of the first peer device, the first peer device then checks whether any one deposited address is the deposited address of the second peer device one by one. If the deposited address of the second peer device is stored in the address database of the first peer device, in step S306, a role is set for the first peer device by the first peer device according to the address of the first peer device and the address of the second peer device. Specifically, the first peer device compares the address of the first peer device with the address of the second peer device which is already deposited in address data base of the first peer device, and when the value of the address of the first peer device is larger than the value of the address of the second peer device, the first peer device designates itself as one of a master and a slave. In step S308, a re-connection between the first peer device and the second peer device based on the designated role is established. However, when the address database of the first peer device has none of the deposited address, then in step S310, the first peer device then attempts to connect to the second peer device, which may be done by using a standard Bluetooth communication protocol for newly-introduced devices, such as by initiating a connection attempt. Accordingly, since the roles for re-connecting with another peer device are determined according to the addresses of the peer devices, so that the re-connection operation for the communication is performed effectively.

Figure 4:
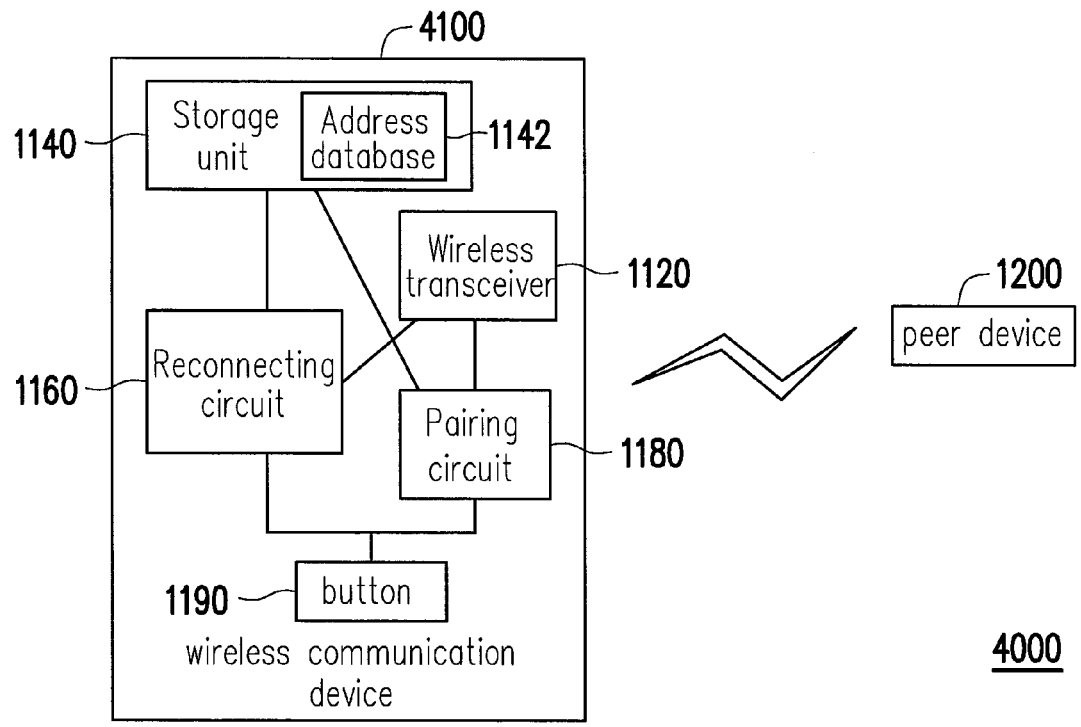
FIG. 4 is a schematic diagram illustrating a communication system according to a second exemplary embodiment of the present disclosure.

FIG. 4 is a schematic diagram illustrating a communication system according to a second exemplary embodiment of the present disclosure.

Referring to FIG. 4, the wireless communication device 4100 is similar to the wireless communication device 1100, though in addition to include the reconnecting circuit 1160, the wireless communication device 4100 further includes a pairing circuit 1180, coupled to the reconnecting circuit 1160. The pairing circuit 1180 is configured to perform a pairing process with a peer device, which has never been paired with the wireless communication device 4100.

For illustration, here the peer device 1200 having the address B1 is detected by the wireless communication device 4100 in the followings.

Figure 5:
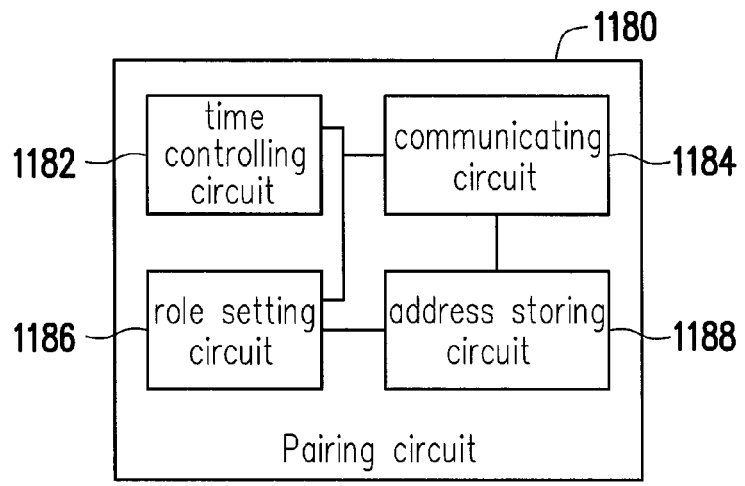
FIG. 5 is a schematic block diagram illustrating a pairing circuit according to the second exemplary embodiment of the present disclosure.

FIG. 5 is a schematic block diagram illustrating a pairing circuit according to the second exemplary embodiment of the present disclosure.

Referring to FIG. 5, the pairing circuit 1180 includes a time controlling circuit 1182, a communicating circuit 1184, and a role setting circuit 1186, and an address storing circuit 1188.

The time controlling circuit 1182 is configured to set a role switching time for the wireless communication device 4100 based on its address Ao. In the second exemplary embodiment, the time controlling circuit 1182 takes the address Ao as a seed to set the starting point for generating a random number and further sets the role switching time based on the random number generated according to the address Ao. Certainly, in another embodiment, the time controlling circuit 1182 is capable of scaling the role switching time when the connection with the peer device 1200 and the wireless communication device 4100 is failed. For instance, the time controlling circuit 1182 is capable of translating the address Ao into the role switching time, e.g., the address Ao may be translated to a millisecond value, a second value or a minute value by multiply a factor value. As such, the role switching time set by the time controlling circuit 1182 is unique.

The communicating circuit 1184 performs a pairing operation with the peer device 1200 with the role switching time based on the address Ao to establish the pairing connection between the wireless communication device 4100 and the peer device 1200. Specifically, the role setting circuit 1186 designates a first role for the wireless communication device 4100, for example, through using a standard Bluetooth communication protocol for initiating a connection attempt with the peer device 1200. The communicating circuit 1184 may check if a second role of the peer device 1200 is different from the first role at each role switching time.

For example, if the wireless communication device 4100 is designated as the master role, the communicating circuit 1184 may check at each role switching time whether the peer device 1200 is the slave role, so that the wireless communication device 4100 and the peer device 1200 are in the master-slave configuration. It should be noted that, since an address for any wireless communication device is unique, so the role switching time for any communication device determined according to a random number using the address as a seed is also almost unique. Consequently, the wireless communication device 4100 and the peer device 1200 may be two different roles, such as the master and the slave, when the communicating circuit 1184 initiates the pairing connection with the peer device 1200, and thus the communication between the wireless communication device 4100 and the peer device 1200 is established.

In another embodiment, if the pairing connection between the wireless communication device 4100 and the peer device 1200 is failed, for example, the second role of the peer device 1200 checked by the communicating circuit 1184 at one role switching time is same as the first role designated for the wireless communication device 4100, the communicating circuit 1184 may designate a new role different from last role for the wireless communication device 4100 at each role switching time. For example, if the wireless communication device 4100 at the role switching time T1 is designated the master role when the pairing connection between the wireless communication device 4100 and the peer device 1200 is failed, the communicating circuit 1184 may designate the slave role for the wireless communication device 4100 the role switching time T1'. As such, the communicating circuit 1184 and the peer device 1200 may be two different roles at the other role switching time, wherein the wireless communication device 4100 and the peer device 1200 are in the master-slave configuration, and thus the communication between the wireless communication device 4100 and the peer device 1200 can be established.

The address storing circuit 1188 is configured to store the address B1 of the peer device 1200 into the address database 1142 as one deposited address after the pairing connection between the wireless communication device 4100 and the peer device 1200 is established. Besides, the address storing circuit 1188 may store a pairing history that records the roles set for the pairing devices and the wireless communication device 4100 that have been previously paired into the address database 1142.

According to this exemplary embodiment, a button 1190 is coupled to the wireless communication device 4100, and more specifically, the button 1190 may be coupled to the reconnecting circuit 1160 and the pairing circuit 1180. The button 1190 is configured to activate the time controlling circuit 1182 to set the role switching time, so that the communicating circuit 1184 starts performing the pairing operation between the wireless communication device 4100 and the peer device 1200 with the role switching time to establish the pairing connection. For example, the button 1190 may be driven by a user when attempting to launch the pairing connection between the wireless communication device 4100 and the peer device 1200.

It should be noted in the present disclosure, the pairing circuit 1180 is implemented in a hardware form, i.e., the time controlling circuit 1182, the communicating circuit 1184, the role setting circuit 1186, and the address storing circuit 1188. However, the present disclosure is not limited thereto. For example, in another exemplary embodiment, functions of the pairing circuit 1180 may be implemented in a software form or a firmware form. For example, a processor and a memory storing program codes are disposed in the wireless communication device 4100 and the processor executes the program codes to perform the pairing process described above.

Figure 6:
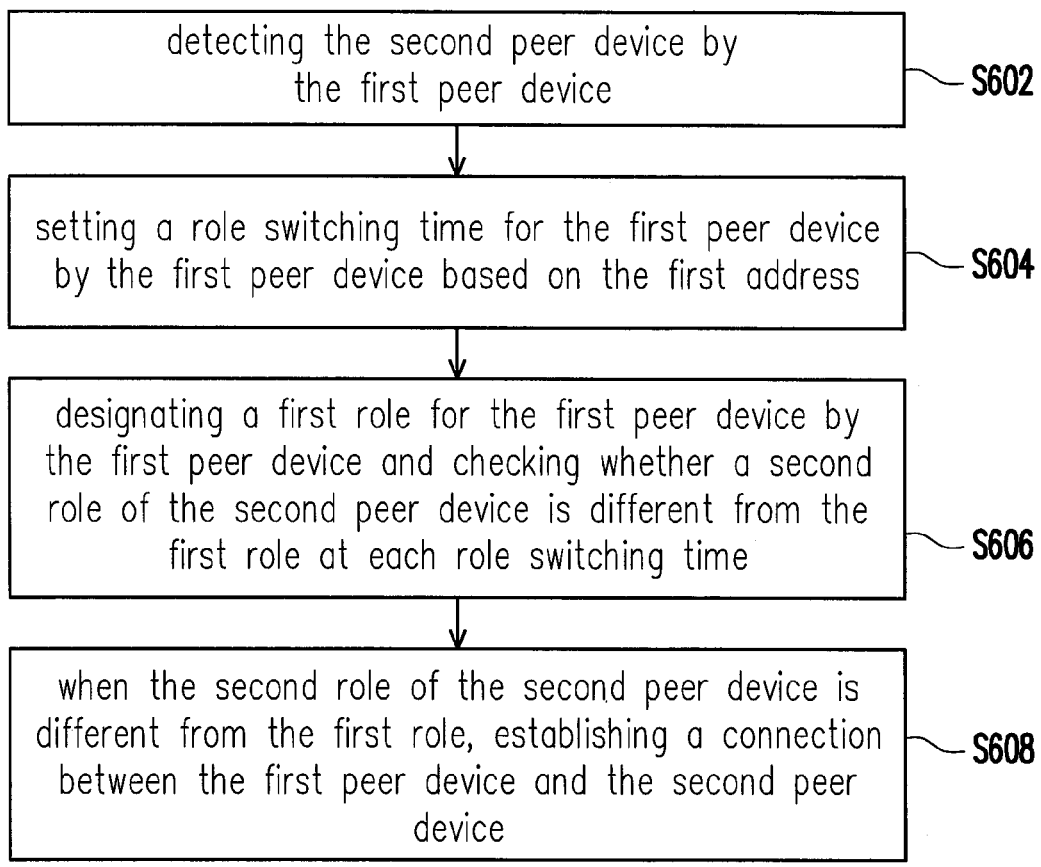
FIG. 6 is a flowchart of a method for performing a pairing process between two peer devices according to the second exemplary embodiment of the present disclosure.

FIG. 6 is a flowchart of a method for performing a pairing process between two peer devices according to the second exemplary embodiment of the present disclosure.

Referring to FIG. 6, in step S602, the second peer device (e.g., the peer device 1200) is detected by a first peer device (e.g., the wireless communication device 4100). For example, the first peer device receives a communication signal sent from the second peer device. In step S604, a role switching time is set for the first peer device based on its address. In step S606, a role is designated for the first peer device by the first peer device and whether a second role of the second peer device is different from the first role at each role switching time is checked. When the second role of the second peer device is different from the first role of the first peer device, in step S608, the pairing connection between the first peer device and the second peer device is established. To be specific, after the pairing connection is established, the address of the second peer device is stored into the address database of the first peer device. Accordingly, since the different role switching times are determined according to the address of the first peer device and the second peer device individually in both the first peer device and the second peer device, the first peer device and the second peer device may have higher chance to be in different roles at each role switching time, so that the pairing operation for the communication is performed effectively.

Figure 7:
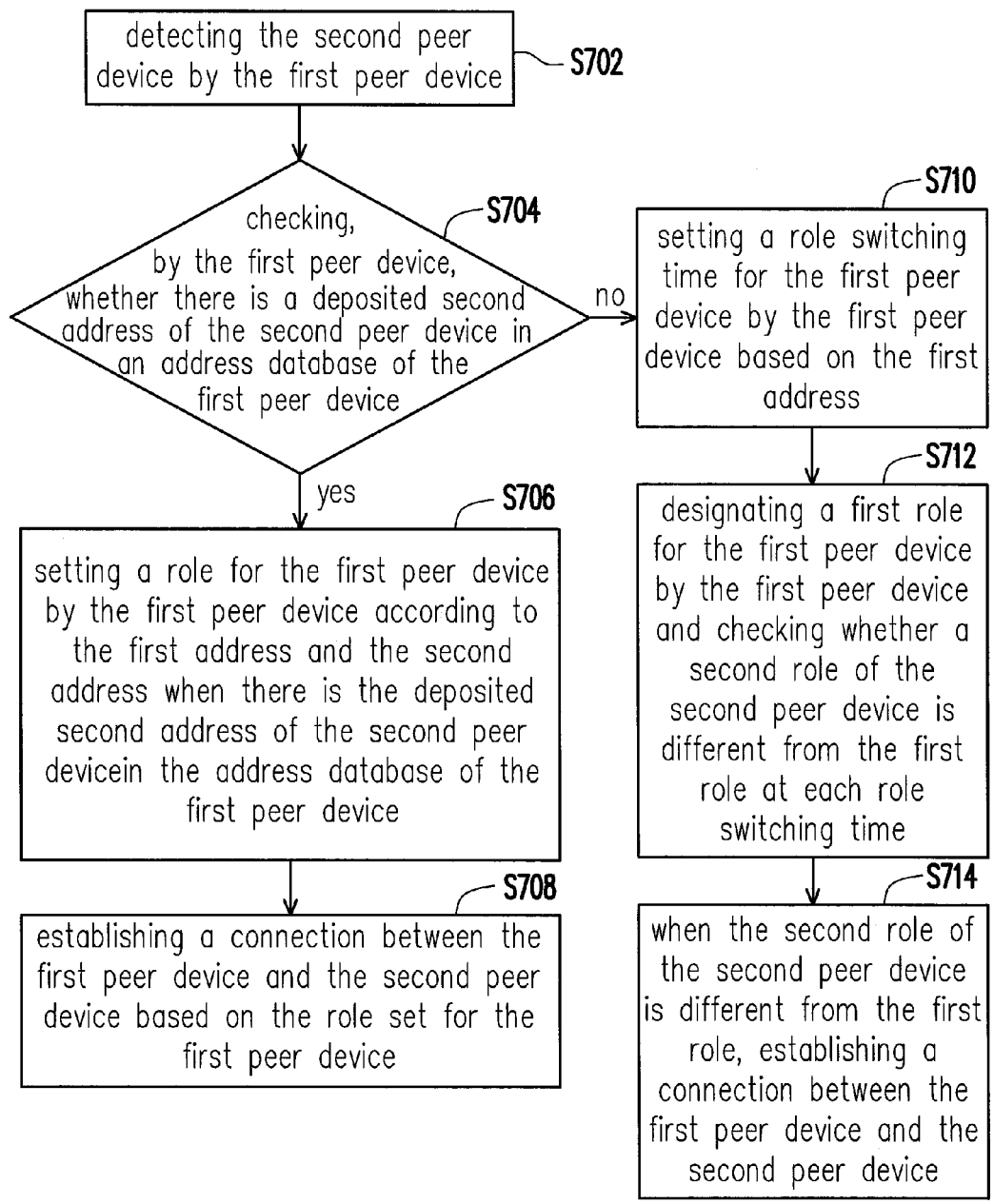
FIG. 7 is a flowchart of a method for establishing a communication between two peer devices according to the second exemplary embodiment of the present disclosure.

FIG. 7 is a flowchart of a method for establishing a communication between two peer devices according to the second exemplary embodiment of the present disclosure.

Referring to FIG. 7, in step S702, a second peer device (e.g., the peer device 1200) is detected by a first peer device (e.g., the wireless communication device 4100). In step S704, whether a deposited address of the second peer device is stored in the address database of the first peer device is checked. If the deposited address of the second peer device is stored in the address database of the first peer device, in step S706, a role is set for the first peer device by the first peer device according to the address of the first peer device and the address of the second peer device. In step S708, a re-connection between the first peer device and the second peer device based on the designated role is established.

If no deposited address, which is able to be matched with the second peer device, is stored in the address database of the first peer device, then in step S710, a role switching time is set for the first peer device by the first peer device based on its address. And, in step S712, a first role is designated for the first peer device by the first peer device and the whether a second role of the second peer device is different from the first role at each role switching time is checked. When the second role of the second peer device is different from the first role of the first peer device, in step S714, the pairing connection between the first peer device and the second peer device is established. Moreover, after the pairing connection is established, the address of the second peer device is stored into the address database of the first peer device. Accordingly, by setting the role and the role switching time according to the address of a peer device for the peer device to perform a pairing operation, the time for enabling a pairing connection between the peer devices can be shorten, so that the pairing operation is performed effectively.

Additionally, the disclosure provides a computer-readable medium, and the computer-readable medium stores a computer executable program. When the computer executable program is executed by a processor, the processor performs the aforementioned methods for establishing a communication between two peer devices. The computer-readable recording medium may be any data storage medium. For example, the computer-readable recording medium may be a read-only memory (ROM), a random-access memory (RAM), a CD-ROM, a magnetic tape, a floppy disc or an optical data storage device.

As described above, exemplary embodiments of the disclosure provide the methods for establishing communications between peer devices, the wireless communication device using the same and a computer-readable medium, in which the role and the role switching time for establishing a connection between the peer devices are determined according to the address of the peer devices, so that the time for enabling a re-connection between the peer devices is shorten and the pairing operation for the peer devices is performed effectively.

The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for establishing a communication between a first peer device having a first address and a second peer device having a second address, the method comprising:
    detecting the second peer device by the first peer device;
    calculating a role switching time based on the first address of the first peer device by the first peer device comprising translating the first address into the role switching time which is an unique time value, wherein the calculated role switching time is used to designate a new role different from last role for the first peer device when each time the calculated role switching time is reached;
    designating a first role for the first peer device by the first peer device and checking whether a second role of the second peer device is different from the first role at each role switching time;
    when the second role of the second peer device is different from the first role, establishing a connection between the first peer device and the second peer device; and
    when the second role of the second peer device is same as the first role, not establishing the connection between the first peer device and the second peer device, and switching the first role to a different role for the first peer device.

2. The method as claimed in claim 1, wherein the step of calculating the role switching time of the first peer device by the first peer device based on the first address further comprises:

Scaling the role switching time when the connection between the first peer device and the second peer device is failed to establish at the role switching time.

3. The method as claimed in claim 1, wherein designating the first role for the first peer device comprising:

designating a new role different from last role for the first peer device at each role switching time.

4. The method as claimed in claim 1, further comprising:

setting the role switching time of the first peer device based on the first address when a button coupled to the first peer device is driven.

5. The method as claimed in claim 1, wherein the connection between the first peer device and the second peer device is a Bluetooth connection.

6. The method as claimed in claim 1, wherein the first address and the second address are Bluetooth device addresses.

7. The method as claimed in claim 1, wherein the step of translating the first address into the role switching time comprises taking the first address as a seed to set a starting point for generating a random number and setting the role switching time based on the random number.

8. An wireless communication device for establishing a communications with a peer device, wherein the wireless communication device has a first address, and the peer device has a second address, the wireless communication device comprising:

a wireless transceiver, configured to detect the peer device;
a storage unit, configured to store an address database; and
a pairing circuit, coupled to the storage unit and the wireless transceiver, wherein the pairing circuit is configured to calculate a role switching time based on the first address of the wireless communication device and translate the first address into the role switching time which is an unique time value, wherein the calculated role switching time is used to designate a new role different from last role for the first peer device when each time the calculated role switching time is reached, wherein the pairing circuit designates a first role for the wireless communication device and checks whether a second role of the peer device is different from the first role at each role switching time, wherein when the second role of the peer device is different from the first role, the pairing circuit establishes a connection between the wireless communication device and the peer device, and when the second role of the second peer device is same as the first role, not establishing the connection between the first peer device and the second peer device, and switching the first role to a different role for the first peer device.

9. The wireless communication device as claimed in claim 8, wherein the pairing circuit scales the role switching time when the connection between the wireless communication device and the peer device is failed to establish at the role switching time.

10. The wireless communication device as claimed in claim 8, wherein the pairing circuit designates a new role different from last role for the wireless communication device at each role switching time.

11. The wireless communication device as claimed in claim 8, wherein the connection between the first peer device and the second peer device is a Bluetooth connection.

12. The wireless communication device as claimed in claim 8, wherein the first address and the second address are Bluetooth device addresses.

13. The wireless communication device as claimed in claim 8, wherein the pairing circuit is configured to take the first address as a seed to set a starting point for generating a random number and set the role switching time based on the random number.

* * * * *